US005659475A

United States Patent [19]

Brown

[11] Patent Number: 5,659,475

[45] Date of Patent: Aug. 19, 1997

[54] ELECTRONIC AIR TRAFFIC CONTROL SYSTEM FOR USE IN AIRPORT TOWERS

[76] Inventor: Daniel M. Brown, 806 Hampshire Dr., Grand Prairie, Tex. 75050

[21] Appl. No.: 419,739

[22] Filed: Apr. 10, 1995

Related U.S. Application Data

[63] Continuation-in-part of Ser. No. 210,592, Mar. 17, 1994, abandoned.

[51] Int. Cl.[6] .......... B64F 1/00

[52] U.S. Cl. .......... 364/439

[58] Field of Search .......... 364/439, 440, 364/461, 441, 443, 444

[56] References Cited

U.S. PATENT DOCUMENTS

| | | | |
|---|---|---|---|
| 3,668,623 | 6/1972 | Csaposs | 340/27 NA |
| 3,925,750 | 12/1975 | Gilbert et al. | 340/27 NA |
| 4,196,474 | 4/1980 | Buchanan et al. | 364/461 |
| 4,516,125 | 5/1985 | Schwab et al. | 343/7.7 |
| 4,706,198 | 11/1987 | Thurman | 364/439 |
| 4,827,418 | 5/1989 | Gerstenfeld | 364/439 |
| 4,949,267 | 8/1990 | Gerstenfeld et al. | 364/439 |
| 4,979,137 | 12/1990 | Gerstenfeld et al. | 364/578 |
| 5,017,141 | 5/1991 | Relf et al. | 434/29 |
| 5,181,027 | 1/1993 | Shafer | 340/961 |
| 5,200,901 | 4/1993 | Gerstenfeld et al. | 364/439 |

*Primary Examiner*—Kevin J. Teska
*Assistant Examiner*—Stephen J. Walder, Jr.
*Attorney, Agent, or Firm*—Charles W. McHugh

[57] ABSTRACT

A computer-based system is disclosed for monitoring and controlling the takeoff and landing of aircraft from an airport that is large enough to require the services that are routinely associated with operations at a control tower. Individual air traffic controllers continue to have the responsibility for monitoring aircraft that are within the operations zone of their tower. But when responsibility for a given aircraft is to be transferred from one controller to another, an icon in each of two separate arrays on a computer screen is sequentially selected by the transferring controller. The first selected icon represents the aircraft; the second selected icon represents the new controller. Other icons give certain control functions (e.g., turning on or turning off certain runway lights) to an air traffic controller, as well as providing additional data to that controller, including information about an aircraft that is not continuously displayed on the controllers screen but is in memory, ready for immediate recall. The computer-based system replaces the manual handling of flight progress strips that are routinely handed from one controller to another—to effect transfer of responsibility.

20 Claims, 10 Drawing Sheets

ELECTRONIC AIR TRAFFIC CONTROL SYSTEM FOR USE IN AIRPORT TOWERS

CROSS-REFERENCE TO A RELATED APPLICATION

This application is a continuation-in-part of Ser. No. 08/210,592 filed Mar. 17, 1994, now abandoned.

FIELD OF THE INVENTION

This invention relates generally to air traffic control systems such as those found at most large airports in the United States; more specifically, it relates to a new electronic system that will cooperate with the existing flight data input/output system that is now in use—for the purpose of automating at least most of the existing tasks that are performed by air traffic controllers, and making possible new activities that have not heretofore been possible. A major part of this invention is the elimination of the present practice of manually passing pieces of paper (commonly called "flight progress strips") from one controller to another in a control tower, as the responsibility for monitoring a given aircraft is being transferred.

BACKGROUND OF THE INVENTION

The control of approaching and departing aircraft at busy airports by air traffic controllers is a stressful occupation involving what some persons might categorize as an unusual mixture of tools and techniques. On one hand, controllers have the use of very sophisticated radar systems and computers to keep track of thousands of aircraft at any one time. On the other hand, controllers are forced to use what might be called almost primitive systems of handling data with regard to individual aircraft, including the manual passing of small strips of paper from one controller to another when the responsibility for a given aircraft is being transferred. Too, each air traffic controller in a busy airport is often required to monitor dozens of arriving and departing flights on a radar screen in the tower. Currently, each aircraft that comes into a controlled area is represented on a flight progress strip—a piece of stiff paper essentially ¾ inch high by 8 inches wide, which is slipped into a narrow plastic holder to facilitate manual handling by controllers. On each strip is printed the aircraft identification (e.g., American Airlines flight No. 1246), the aircraft type (e.g., a Boeing 747), the departure and arrival airports and any en route airports that serve as waypoints, departure time (in local time), Federal Aviation Administration (abbreviated FAA) region, etc.

All of the printed information on a flight progress strip is actually printed in a local tower—based upon information that comes on telephone lines from one of 20 mainframe computers in the U.S. These mainframe computers are referred to as flight data input/output computers, which would properly be abbreviated as "FDIO." However, a commonly used colloquialism for referring to these interconnected (and redundant) computers is "FIDO." In one sense, the collective FIDO computers may be thought of as the "mother of all great computers," because they have so much stored information about all kinds of aircraft (including their dimensions, normal weights, nominal cruising speeds, etc.), the locations of airports throughout the world, etc. So when an airline or pilot files a flight plan in Boston, announcing an intention to fly to Dallas, FIDO can cause a flight progress strip to be printed in the control tower in Dallas—well before the air traffic controller will ever make radio contact with the incoming pilot.

When a given flight progress strip has been printed in a local airport, someone (typically the clearance delivery operator) will tear off the strip and insert it into a narrow plastic sleeve, so that it can be manually handled with ease. The sleeve has an open front so that an air traffic controller will later be able to write certain information on the face of the printed strip with a pen; written information on the face of the strip will typically be the radio frequency over which communication will be established between the controller and the pilot, the runway that the aircraft is expected to land on, gate information, etc. For a departing aircraft, handwritten information added to a printed flight progress strip may include the planned takeoff direction, the altitude that the pilot is expected to reach when leaving the airport's controlled airspace, etc. When a controller is monitoring several aircraft, the plastic holders are arranged on an inclined rack in front of the controller's work station. A typical rack may hold as many as 36 plastic sleeves, arranged in two columns of 18 each in front of the controller. When a given aircraft has taken off and it is no longer the responsibility of a particular controller, the sleeve for that particular aircraft is manually pulled off the rack, the strip is pulled out of the sleeve and deposited in the supervisor's "archives" space, and the empty plastic sleeve is dropped into a bin for reuse.

In the event that an aircraft has departed a gate on one side of a major airport, but the aircraft is expected to take off on a runway on the other side of the airport, logic dictates that the aircraft be "passed-off" to a controller whose work station is on the other side of the tower. This is presently accomplished by having the first controller pick up the plastic sleeve for this particular aircraft from his or her rack and physically hand it to a controller on the other side of the tower. The receiving controller then places the plastic sleeve among those which are already on his/her rack, and responsibility for the aircraft has thereby been officially "transferred." Unfortunately, the somewhat primitive nature of this practice of transferring responsibility for aircraft in a control tower is susceptible to accidental error. Strips can be misplaced or even "lost" if they fall to the floor and are not observed by a controller, etc. In fact, the official FAA report of the crash that occurred in Los Angeles on Feb. 1, 1991 (in which an incoming Boeing 727 landed on top of a smaller commuter aircraft that was getting ready to take off) was attributed—in part—to misplacement of a flight progress strip in the airport tower. According to the Aircraft Accident Report, NTSB/AAR-91/08, PB91-910409 dated Oct. 22, 1991, one of the causes of the Los Angeles runway collision was that the clearance delivery operator in the tower did not follow the rules and pass a particular strip to a certain ground controller. The local controller subsequently had an incorrect perception of the traffic situation on the ground, and gave clearance to the larger aircraft to land; it eventually landed on top of the departing commuter aircraft—an aircraft whose flight progress strip had been "misplaced" in the tower.

Another situation can arise when a TRACON operation (which is involved in the tracking of airplanes by radar, from take off to a point that is fifty miles out) is moved so that it is no longer within convenient "hand-off" distance from one person to another. For example, at Chicago's O'Hare airport, the TRACON function has been accomplished for many years in the basement of the control tower; but plans are well under way to transfer that function to a facility that is several miles away—in Elgin, Ill. As long as multiple functions were concentrated in one building, a flight controller simply pulled a flight progress strip out of its plastic holder and dropped the strip down an open shaft that led to the basement, much like dirty linen in a hotel is frequently dispatched to the basement for washing. To deal with the new logistics of having TRACON people located miles from the control tower, it has been suggested by some officials that facsimile machines be used to get data on departing planes from the tower to the TRACON facility. Of course, critics of such a plan might point out that passing flight information via outgoing and incoming FAX machines is not necessarily the best way of preserving the quality of hard copy, nor is it likely to be productive in terms of efficient use of man hours, etc. FAX-to-FAX communication also reintroduces the possibility of the information associated with a given strip being lost while it is in transit from a controller to the TRACON facility.

While the management of thousands of aircraft in the air over the U.S. at any given time may be perceived as being in need of modernization, this is not to say that there haven't been persons who have given their attention to making air travel even safer than it is. In particular, there are those who have given attention to possible ways of removing some of the stress from air traffic controllers by using modem technology. Among some of the more significant proposals are those found in U.S. Pat. No. 4,827,418 to Gerstenfeld entitled "Expert System for Air Traffic Controller Training"; U.S. Pat. No. 4,890,232 to Mundra entitled "Display Aid for Air Traffic Controllers"; U.S. Pat. No. 5,181,027 to Shafer entitled "Method and Apparatus for an Air Traffic Control System"; and U.S. Pat. No. 5,200,902 to Pilley entitled "Airport Control/Management System." But in spite of the suggestions in these patents, there has remained a need for improvement in the way that air traffic controllers do their work in the control towers at major airports; and it is an object of this invention to provide a system that will satisfy this need.

Another object is to increase the capabilities of air traffic controllers by increasing the information that they may selectively call up from various data files that are, or could be, tied in with their computers.

A further object is to increase the ease with which an archival record may be created of work in a control tower, so that training of new controllers might be enhanced by permitting them to observe real situations at speeds that are slower than they happen in real time.

One more object is to provide a system for monitoring the takeoff and landing of aircraft at a busy airport, which system offers improved safety factors for all concerned.

These and other objects will be apparent from a careful reading of this specification and the claims appended thereto, as well as reference to the several figures of the drawing attached hereto.

SUMMARY OF THE INVENTION

Figure 1:
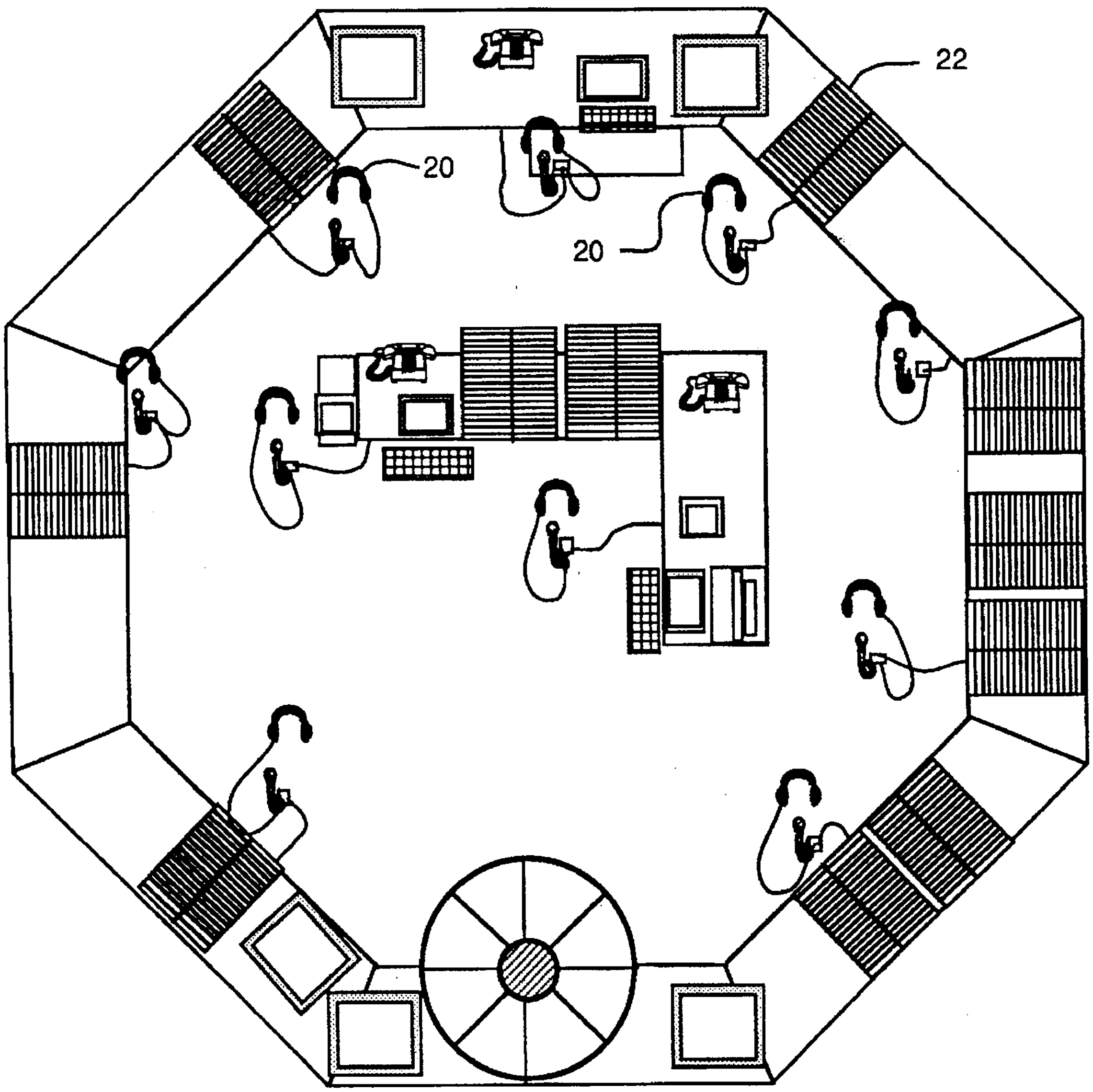
Prior Art FIG. 1
FIG. 1 is a schematic plan view of an exemplary "cab" in an airport tower for air traffic control, showing how the control center of a "prior art" tower is physically arranged—with several peripheral work stations where controllers using flight progress strips do the bulk of their work, monitoring and controlling incoming and outgoing aircraft.

This invention relates to improving operations in an airport tower by making possible the electronic handling of data that heretofore had been handled in a mostly manual fashion. In particular the invention involves the transfer of information (sometimes referred to herein as a "data packet") by using computers, terminals, screens, transmitter/receivers, recorders, and the like, as a substitute for the flight progress strips that have been traditionally been used in airport towers. With this new system, the printing of flight progress strips could be eliminated, and the information normally appearing on those strips can be presented in an electronic display on a computer-driven screen in front of a controller. The electronic display for an individual aircraft does not need to be as big as the old paper data strip, because a controller really only needs three pieces of information in order to talk with a pilot and "control" an aircraft: 1) the flight identification number for an aircraft, e.g., American Airlines flight number 1421; 2) the type of aircraft, e.g., a Boeing 747; and 3) the scheduled departure or arrival time.

The screen in front of a controller is preferably an active screen, rather than just being passive—like the screens that airlines routinely place in airport terminals to announce the arrival and departure of flights. By the term "active," it is meant that a controller can select an image associated with a particular aircraft on his or her screen and do something to or with the image. If a first controller wishes to transfer responsibility for an aircraft to another controller, the first controller need only "select" the image for the aircraft on his/her screen, and then "select" an image (icon) on the same screen that represents the second controller. In one embodiment, the process of "selecting" a given image can be accomplished with a touch-sensitive computer screen and the appropriate computer hardware and software. In an alternative embodiment, "selecting" an aircraft can be accomplished in the same manner that a mouse is used to "click" on an icon in a MACINTOSH™ computer; the image representing an aircraft is then dragged across the screen until it overlaps an image representing the second controller. Releasing an aircraft image over an image associated with the second controller serves to transfer responsibility for that aircraft from the first controller to the second. The plane's image will then be eliminated from the first controller's screen, and it will automatically appear on the second controller's screen. Responsibility for a given aircraft can also be transferred to a Supervisor or the Local Controller, etc.

Additionally, the first controller may want to obtain some information about a particular aircraft in a first array of aircraft symbols on the left side of a screen. By first selecting the symbol for a given aircraft and then selecting, say, DETAIL, all of the data that is now available on flight progress strips can be displayed on the screen in front of the controller. By selecting MOVE and subsequently selecting two aircraft symbols in the first array, the first selected aircraft symbol will be moved to a position immediately above the second selected aircraft. Generating the command to MOVE, in effect, can be used to reorganize a display of aircraft symbols in the first array of symbols. Pressing FREQUENCY will reveal to the controller the frequency with which radio communications are to be accomplished with the pilot.

At the end of a work shift or a prescribed period of time (e.g., about 8 hours), pressing the icon labeled HISTORY can be used to retrieve from an archival file a listing of all of the aircraft that a particular controller has handled during the assigned period. Pressing CURRENT returns the screen display to real-time status after HISTORY has been selected. The SORT image may be used by a controller to sort (or organize) the displayed aircraft by carrier (e.g., American, Delta, etc.), by arrival or departure time, or by aircraft type. Pressing WEATHER will temporarily display the local weather conditions on a controller's screen, so that the controller does not have to leave his or her work station to go to a centralized depository for the latest weather report.

To enter new data at the control tower, i.e., for an air traffic controller to add to the data that was generated by the FIDO computer, it is advantageous to use a hand-held pen-based computer with an optical communication feature that permits a person to transmit files by an optical link. Such pen-based computers are available from several companies, including Apple Computer, Inc. (i.e., the NEWTON™ computer), Motorola, and Texas Instruments, Inc. And by using such a pen-based computer to enter fresh data with regard to a particular aircraft, a controller could also use the optical link for voice communication with pilots. (At present, controllers are "hard wired" to their terminals for voice communications.) With a system such as has been described herein, it would no longer be necessary for a controller to be tied to a workstation by the cord that currently limits controllers to a few feet of movement.

DETAILED DESCRIPTION OF A PREFERRED EMBODIMENT OF THE INVENTION

Figure 2:
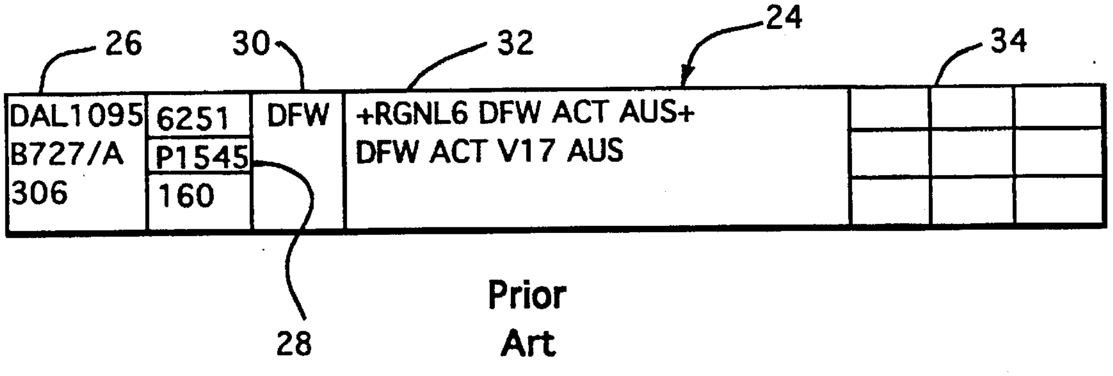
FIG. 2 is a front view of a typical flight progress strip of the prior art, showing the information that is normally printed on a flight progress strip for an outgoing (or departing) aircraft, said information being furnished from a centralized computer for effecting air traffic control, i.e., the "FIDO" computer.

Referring initially to FIG. 1, and exemplary control tower "cab" is shown in a top plan view. A plurality of work stations are distributed around the periphery of the cab, with symbols for an earphone/microphone combination 20 indicating where respective controllers are normally situated in the cab. Also shown at each of the workstations is a rack 22 on which a controller will place individual ones of the plurality of flight progress strips. Referring additionally to FIG. 2, an exemplary flight data strip 24 in accordance with current practice is shown. Each strip 24 will have printed at its left end a primary identifying box 26 that contains the essential information about a particular aircraft. In the example of FIG. 2, this essential information identifies the aircraft as Delta flight No. 1095, which is a Boeing 727 Modification A. The squawk number (which is a radio communication number assigned to this particular flight) is 306. The second box 28 indicates that the anticipated departure time is P1545, i.e., 3:45 PM. The altitude that the flight is to reach as it leaves the controlled area is 16,000 feet, as indicated by the numerals "160." The departure airport is indicated in box 30, which is the Dallas/Fort Worth International Airport—abbreviated DFW. Box 32 designates the final destination of the flight, plus any intermediate waypoints that the aircraft is scheduled to fly over en route to its destination. The empty boxes 34 on the right side of the flight progress strip 24 are provided for the use of a local air traffic controller who makes entries concerning radio contacts with the aircraft, the frequency over which communications are conducted, and any other information that may be unique to this particular flight.

Figure 3:
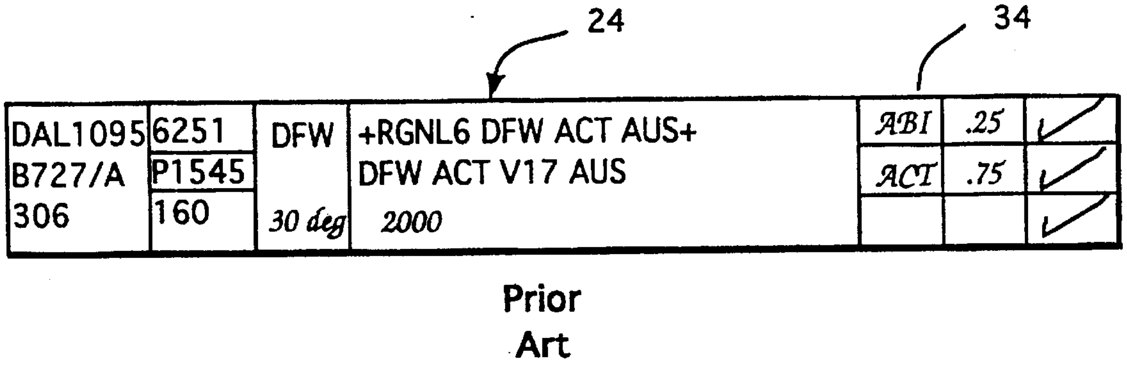
FIG. 3 is another front view of a typical flight progress strip of the prior art, showing some additional information that has been handwritten on a flight progress strip by an air traffic controller.

FIG. 3 illustrates a "used" flight progress strip 24 that has been annotated by an air traffic controller to show information about a particular flight after the flight progress strip was printed. For example, an entry has been handwritten by a controller in one of the boxes of section 34, namely, "0.25." This indicates that the initial radio frequency for communication with this aircraft was 124.25 megahertz. Later, for some reason, the communication frequency was switched to 127.75 megahertz. The checkmarks on the right of block 34 indicate that there have been three radio contacts with the pilot of the aircraft.

Figure 3A:
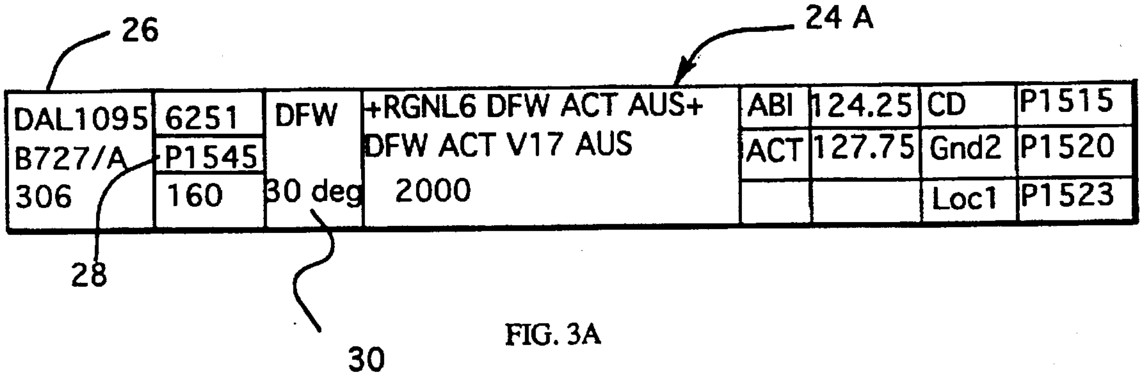
FIG. 3A is a front view of a new electronic image of a flight progress strip, as it might appear on the computer screen of an air traffic controller.

Turning next to FIG. 3A, the flight information that is to be electronically recorded (and displayed) in accordance with this invention is shown. In large part, the printed information (which basically comes from the FIDO computer) remains the same in blocks 26 and 28. In block 30, a handwritten notation (30 deg) can be electronically displayed with alpha-numeric symbols by using a hand-held, pen-based computer that an air traffic controller keeps at his or her work station. An exemplary pen-based computer is the APPLE NEWTON™ computer. Those skilled in the art will recognize that a handwritten notation on the screen of the NEWTON™ computer can be translated into ASCII characters that will be more easily readable by all persons—including those who may be unfamiliar with the writing style of a particular controller. This feature alone will offer advantages in safety, by helping to eliminate errors in personal interpretation of handwritten data. The proposed flight progress strip 24A also has space for recording certain times at which various events occurred. The notations "CD" and "P1515" indicate that the clearance delivery operator spoke to the pilot at 3:15 PM. There is also an indication that ground controller No. 2 spoke to the pilot at 3:20 PM, communicating the necessary information for merging his aircraft with the traffic on the assigned taxiway. At 3:23 PM, local controller No. 1 gave the pilot clearance to take off. This electronic rendition of a flight progress strip 24A is capable of being observed on any computer screen that is connected to the controller's terminal.

Figure 4:
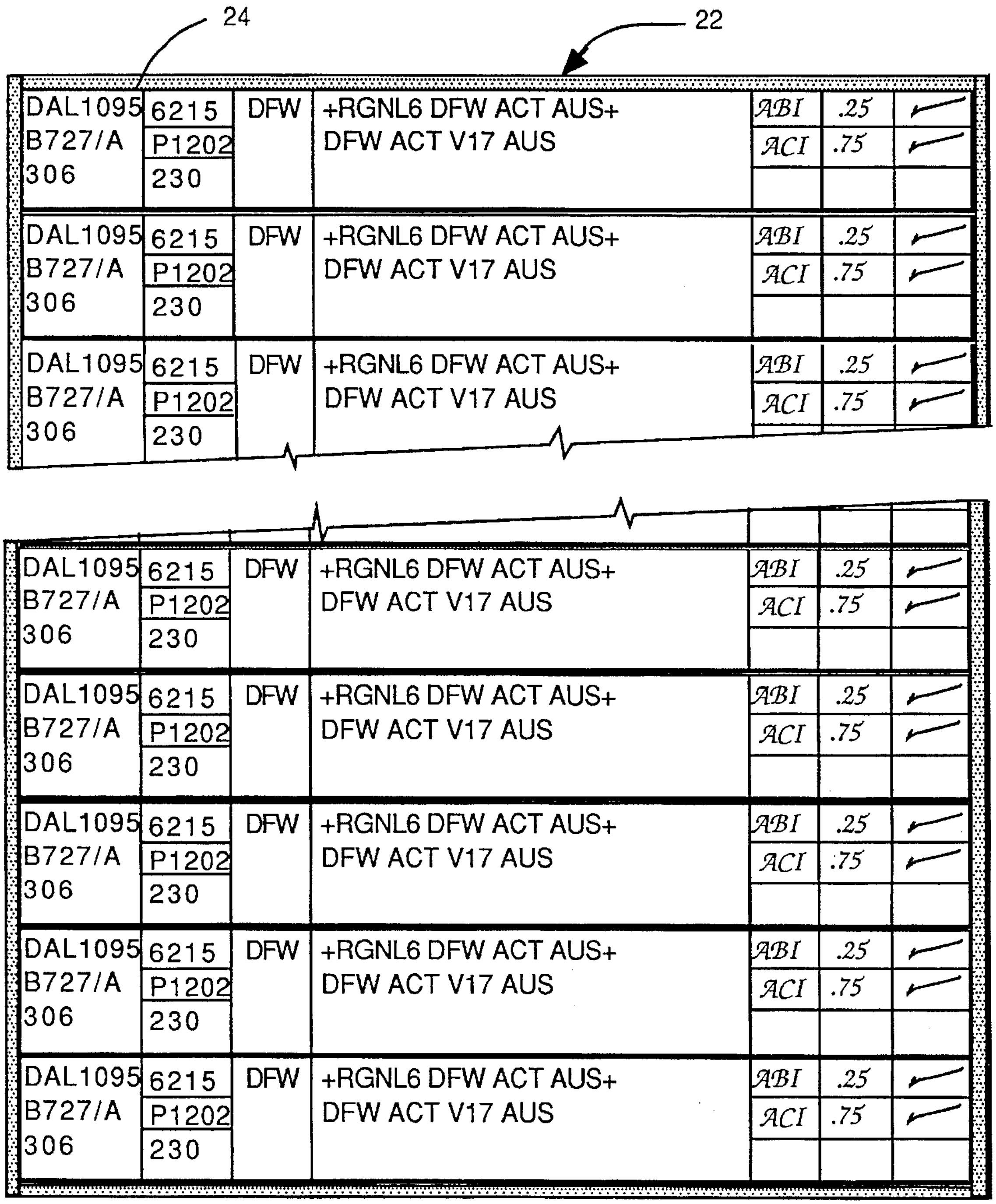
Prior Art FIG. 4
FIG. 4 is a front elevational view of a "rack" of the prior art, showing a plurality of flight progress strips that are temporarily mounted in plastic holders and vertically stacked, one above the other, in an inclined device at a controller's work station.
Figure 5:
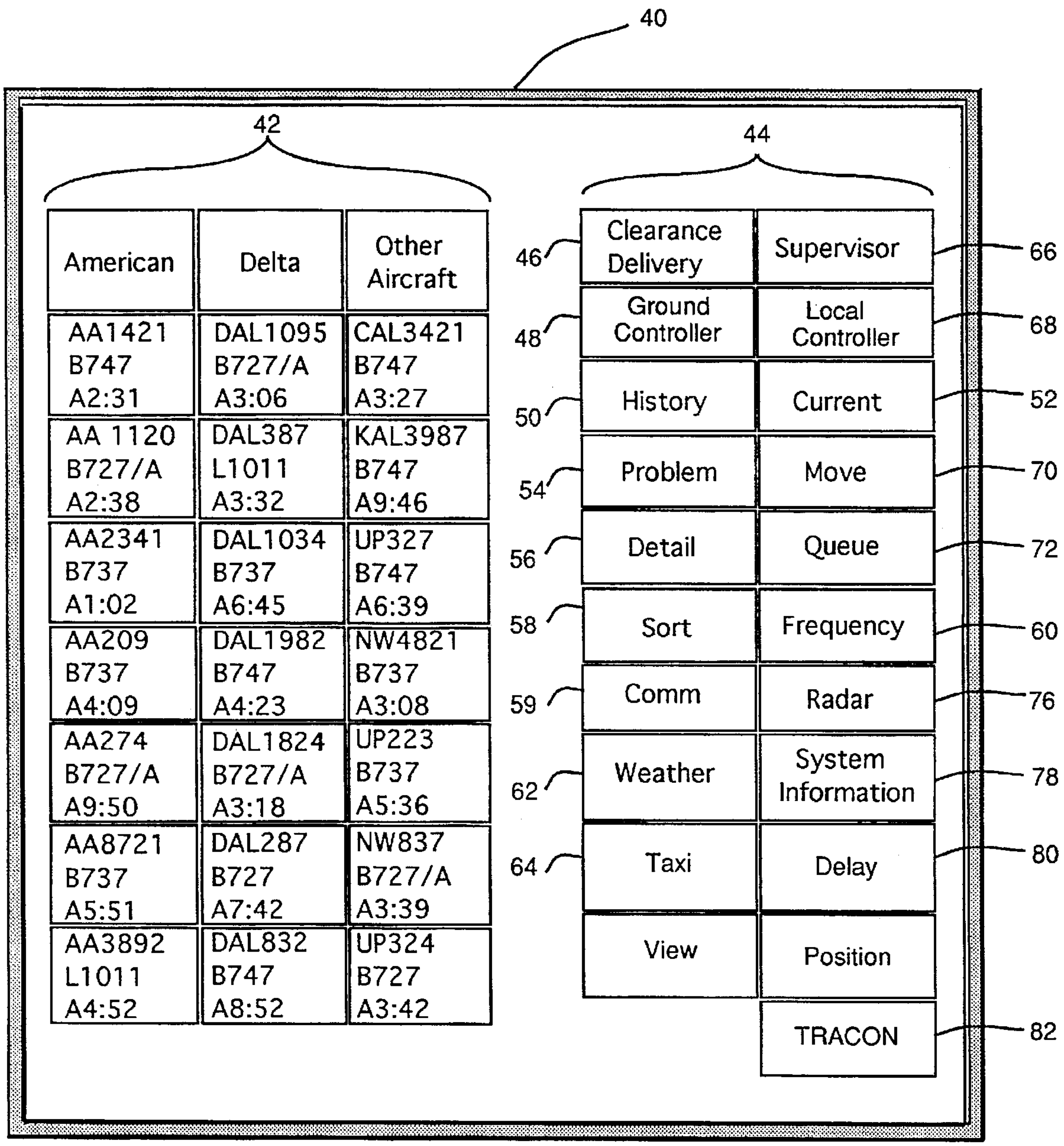
FIG. 5 is a front elevational view of a computer screen in accordance with this invention, showing a computerized alternative to the old fashioned mechanical system (shown in FIG. 4) for keeping track of a plurality of aircraft.

Referring next to FIG. 4, a present system of storing, arranging, and organizing the "prior art" flight progress strips is shown—in an exemplary rack 22. (For simplicity, all of the flight progress strips in this figure have been printed as identical strips; in reality, there would be thirty-three distinct strips 24 representing thirty-three different aircraft.) In contrast to the present showing in FIG. 4, it is proposed that a computer screen 40 be installed in accordance with this invention at the work station for each person who has air traffic control responsibilities in a tower cab. In FIG. 5 there is shown an exemplary screen 40 as it might appear in front of a typical air traffic controller, who may be designated as "Air Traffic Controller No. 1" This is suggestive, of course, that there may others who have the same function and duties, etc. The screen 40 (associated with a computer terminal at the work station) will have two arrays of images or icons that are displayed for the controller to work with. The left array 42 will contain a plurality of blocks, each of which essentially constitutes an image (or icon) that is associated with a particular aircraft. For example, the lowest image in the left-most column in array 42 is indicative of American Airlines flight No. 3892, which is an L1011 aircraft that has a scheduled departure time of 4:52 AM. It will be recognized that this information constitutes the same information that is present in a prior art flight progress strip 24. There is other information about this particular flight that is in a "data packet" for this aircraft; but there is little need to have this additional information continuously displayed in front of a controller. If more detailed information about this particular aircraft is desired, a controller would merely "select" the image in left array 42 and subsequently select the image "Detail" in right array 44. Selection can be accomplished in any one of several ways, which should be readily apparent to those skilled in the art. For example, if the computer screen 40 is an interactive touch-sensitive screen, then manually pressing on the screen over an electronic image will serve to choose that item. Alternatively, a screen associated with a MACINTOSH™ computer will have its images or icons selected by clicking on them with a mouse. It is advantageous to have an image change color when it has been selected, as a visual aid to the controller. Dragging an icon from array 42 to one of the images in array 44 will cause the computer to accomplish with regard to the first item the task associated with the second icon (in array 44). For those who are not familiar with the concept of clicking with a mouse and dragging an icon across a screen, there are numerous books that thoroughly explain this action. For example, *The Apple Macintosh Book* by Cary Lu, published by Microsoft Press in 1985, is a suitable reference book on this subject.

Alternatively, a voice-based computer system may be utilized to sequentially select icons in two arrays. A first controller who wishes to transfer responsibility for a particular aircraft to the clearance delivery operator may speak into his microphone the words "American Airlines 3892" and then "clearance delivery." The computer, which has been "trained" to recognize the controller's voice input, will then delete the icon for that aircraft from the left array, and simultaneously add it to the screen at the clearance delivery operator's work station. This can happen regardless of whether the clearance delivery operator is sitting next to the original air traffic controller, or is in a satellite tower a mile away. So regardless of whether a touch-sensitive computer system is used, or a MACINTOSH™ system with its characteristic mouse and icon-dragging routine, or a voice-actuated system, the principles described herein are essentially the same—and the anticipated benefits will be available.

Turning further attention to the second array 44 in FIG. 5, the Clearance Delivery icon 46 is indicative of a person—namely, the clearance delivery operator who has responsibility for verifying that flight clearance has been given for a particular flight. The Ground Controller icon 48 indicates another person—who gives permission for the aircraft to enter an appropriate taxiway from the parking area. The History icon 50 is associated with a command issued by a particular controller to call up, on the left side of the computer screen, an historical report of all of the aircraft that he or she has handled in a particular time period, e.g., for the hours that have been worked in a particular shift since log-on by that operator. The Current icon 52 is effective to cause the computer to revert to the display shown in FIG. 5; this icon would only be effective when the History icon has been previously selected.

The Problem icon 54 serves to highlight a particular image in array 42, so that it will be given increased attention by the controller. The need for extra attention by a controller can be manifested by switching the color of a selected image, or reversing it from black-on-white to white-on-black, or putting a border around it, etc. Alternatively, the Problem command may be used to provide a bold, flashing outline around a given image in array 42. Selecting "Problem" a second time, after again selecting the pertinent aircraft image, serves to remove the visual emphasis that was achieved by initially choosing "Problem." The results of selecting the Detail icon 56 have already been described. The Sort icon 58 is associated with a computer command to organize or sort the queues of flight progress strips as they appear in vertical columns in array 42. Sorting may be accomplished according to chosen criteria, e.g., all aircraft sorted by flight number, arrival or scheduled departure time, or by aircraft type and carrier. The Comm icon 59 is used by a controller to indicate that he/she has already talked to a particular pilot; and selecting it causes the airplane's icon to be surrounded with a different color border. This serves as a visual reminder to the controller that he/she has already talked to that particular pilot, and avoids the confusion that might arise in a pilot's mind if a controller gave the same message more than once. For example, hearing a second message could cause a pilot to become nervous—wondering if the second instruction had just been given to a different pilot, who was now being sent onto the same taxiway that the "original" pilot had been instructed to enter. This has the effect of increasing radio traffic between pilots and air traffic controllers, as pilots seek confirmation that they are the only ones who have been given instructions to move to a specific taxiway, etc.

Frequency icon 60 is selected by the controller to call up the frequency that has been assigned for communication with a respective aircraft. Thus, selecting the image in array 42 that corresponds to Delta flight 832, and then selecting icon 60, will cause a display of the radio frequency to appear on the screen for a short period of time, which can be preprogrammed or manually controlled. For example, with a touch-sensitive computer screen, the frequency can be displayed for as long as a controller keeps a finger pressed onto the frequency icon.

The Weather icon 62 may be used to display on the controller's screen 40 information that a pilot may wish to have about local weather conditions. The displayed information may be somewhat simplistic, or it may be highly technical—including barometric pressure and the like.

The Taxi icon 64 is utilized to indicate that a selected aircraft has been cleared to taxi out to its assigned runway. Selecting Taxi icon 64 ideally has the effect of changing the color of the image of the selected aircraft in array 42. In addition, it begins to count the minutes that are consumed after an aircraft has been cleared to taxi. This information is useful to a controller because inordinate delays in departure must be reported to Flow Control Division of the FAA in Washington, D.C. At present, there is a regulatory requirement that a taxi delay of more than 55 minutes must be reported. As with other commands in array 44, this system can remove from a controller some of the responsibility for keeping records and the like, thereby allowing the controller to concentrate on more important matters—such as observing runways and keeping aircraft apart.

The Supervisor icon 66 is used, when necessary, to transfer responsibility for a selected aircraft from a controller to a supervisor. For example, if a particular aircraft is in an unusual delay situation, and a controller already has a full load, the responsibility can be readily transferred by first selecting the aircraft's image in array 42 and then selecting Supervisor in array 44.

Local Controller icon 68 may be selected by an air traffic controller using screen 40 to transfer responsibility for a particular aircraft to the local controller, who will give a pilot final instructions to "turn the corner" onto the assigned runway and take off.

The Move icon 70 is utilized to change the order in which images appear in array 42. For example, assume that there is a desire to change the position of a Delta flight. The Move icon in array 44 is first selected; then Delta flight 1034 is selected and its icon is dragged down until it is over Delta flight 832—where it is released. This will move Delta flight 1034, temporarily leaving a blank space that is then filled by all of the icons below the "blank" space. This has the effect of placing the 1034 icon below the 832 icon.

The Queue icon 72 is used to establish a desired set of aircraft for display on a controller's screen. For example, at a busy airport during "rash hour," there may be sixty American Airlines' flights that are scheduled for departure in a ninety-minute period. In order to permit a controller to remove from his or her screen all of the aircraft other than American flights, the controller would initially select American in array 42 and then select Queue in array 44. The first thirty-six "American" images that can be displayed in array 42 will then be presented in front of the controller, organized according to scheduled departure times. The command keys in array 44 are always displayed, regardless of what has been temporarily placed on the left side of the screen. By again selecting the Queue icon, the screen 40 will again display all aircraft that were present on the screen before the queuing activity was initiated.

The Radar icon 76 may be used to present, in front of a controller, a radar image that would not otherwise be displayed at a controller's work station. This will have the effect of simplifying the work area for a controller, and saving money by reducing the amount of capital expenditures that are needed to outfit a tower cab.

For the purpose of making certain reference materials easily available to a controller, the System Information (often abbreviated SIA) icon 78 may be selected in order to provide a display of information that would otherwise have been presented on a "systems information" terminal in the tower cab. There is usually only one such SIA terminal in each tower, and delays inherently arise when two or more controllers are wanting certain information at the same time.

The Delay icon 80 may be used by an air traffic controller to call attention to the fact that a particular aircraft has been delayed in its takeoff by an inordinate amount of time, and perhaps needs to be given priority over other aircraft in a queue. For example, if the departure of a particular aircraft has been delayed by de-icing and it should now be given priority, a change of color on the aircraft's image (in array 42) will remind the controller of the desirability of moving that particular aircraft toward takeoff.

The TRACON icon 82 is selected by the local controller after a plane has taken off, so that the personnel at TRACON who are monitoring all aircraft in the air—by radar—will have a record of the fact that another aircraft has joined those already in the air.

Perhaps it should be mentioned that the full screen 40 shown in FIG. 5, with all of the icons shown in array 44, is meant to be exemplary of the varied capabilities of the system disclosed herein. In any specific airport situation, a management decision might be made to omit one or more of the command icons (in array 44) from a given controller's screen. Hence it may be that there will be some variety in the number of icons that are present on one or more screens. Too, the location of any of the icons on a screen 40 can be adjusted at will by a computer programmer, using conventional techniques. As for the software to actually accomplish the tasks described above, this too will be apparent to those skilled in the art. The necessary programming to achieve these tasks has been experimentally accomplished three times, once with a UNIX™ platform using the C-language to program the graphical user's interface of the images and icons (also known as "touch pads") on the screen. INFORMIX™ software was used as the database program for the flight progress strip data. Programming has also been accomplished on a 486 PC (operating at 66 megahertz) using a POWERMAKER™ program to generate the images, database packets and icons, and also to effect the data transfers. ORACLE™ was used as the database program for this latter implementation. A third implementation used MACINTOSH™ QUADRA™ computers, with HYPERCARD™ 2.2 being the graphical user interface control software. FILEMAKER PRO™ 2.1 was used as the database program.

Figure 6:
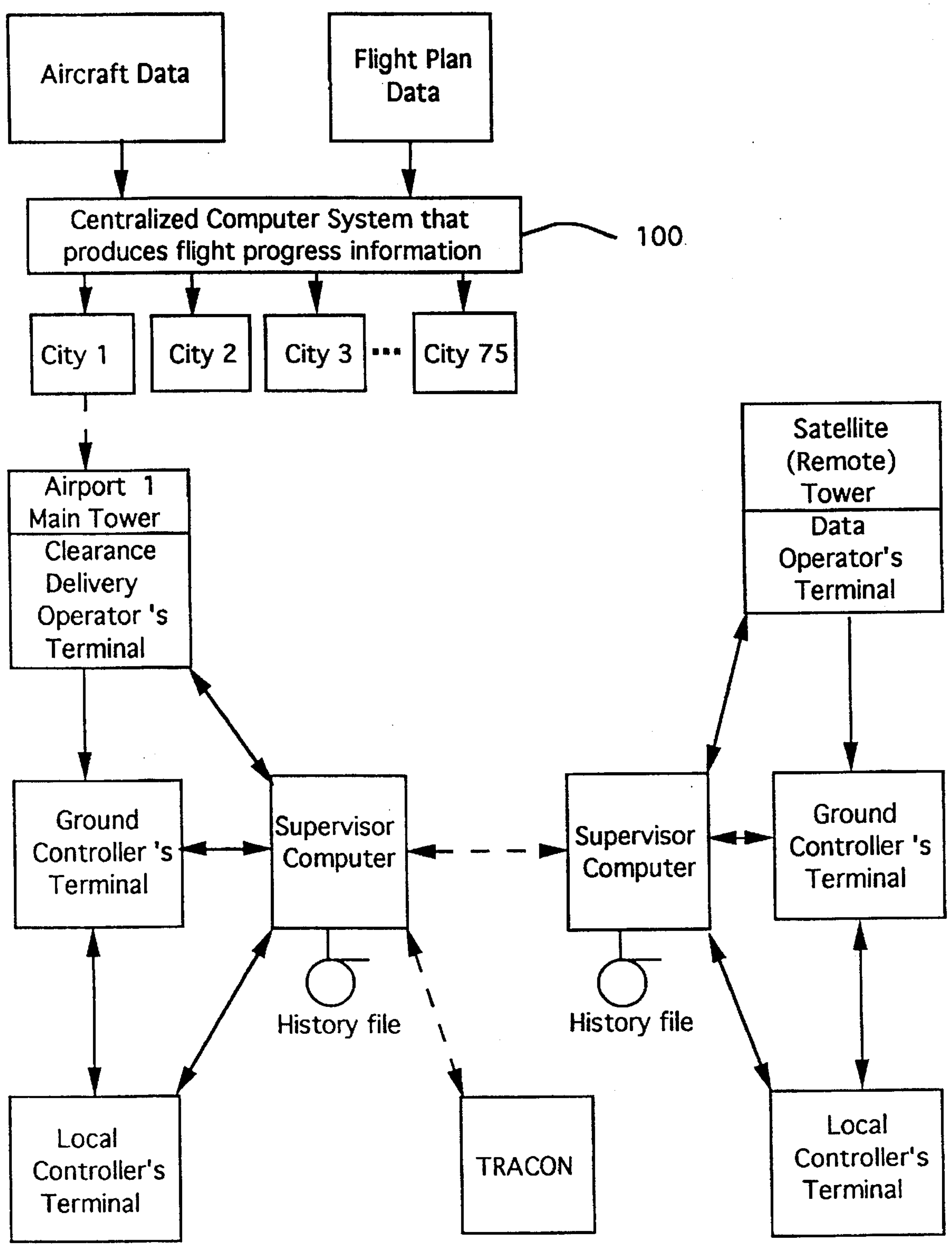
FIG. 6 is a flow chart showing how information from a centralized computer (e.g., "FIDO") can flow down to the personnel who have flight control responsibilities in towers at various airports, and indicating how information from FIDO can be manifested on a computer screen like that shown in FIG. 5.

Referring next to FIG. 6, each of the preferred controller's terminals (and their associated screens) will be equivalent to a 20-inch Tektronix TEKEXPRESS 350 terminal that has a touch screen overlay for data manipulation. These local terminals are connected to the centralized air traffic computer, which has herein been described as the FIDO computer(s), designated in FIG. 6 by the reference numeral 100. The fault-tolerant centralized computers 100 have the capacity of an IBM 3090 mainframe, and are connected to a plurality of scattered airports via leased, broad-band telephone lines. It is along these telephone lines that the "data packets" are transferred, said packets having been generated in response to information supplied by aircraft manufacturers and the like, as well as flight plans submitted by airlines and/or pilots, etc. The centralized computers 100 pass along data packets with regard to individual aircraft to airports, represented in the figure as City 1, City 2, etc.; those packets are then passed to the main tower, where they are initially handled by the Clearance Delivery Operator—for aircraft that are scheduled to depart from an airport. Incoming aircraft pose less of a management problem for the arrival airport, and a data packet for such aircraft may go directly a local controller. All of the transactions that are indicated in this figure, being electronic, can be saved on tape for archival purposes; this is suggested by the "History file" notation.

Figure 7A:
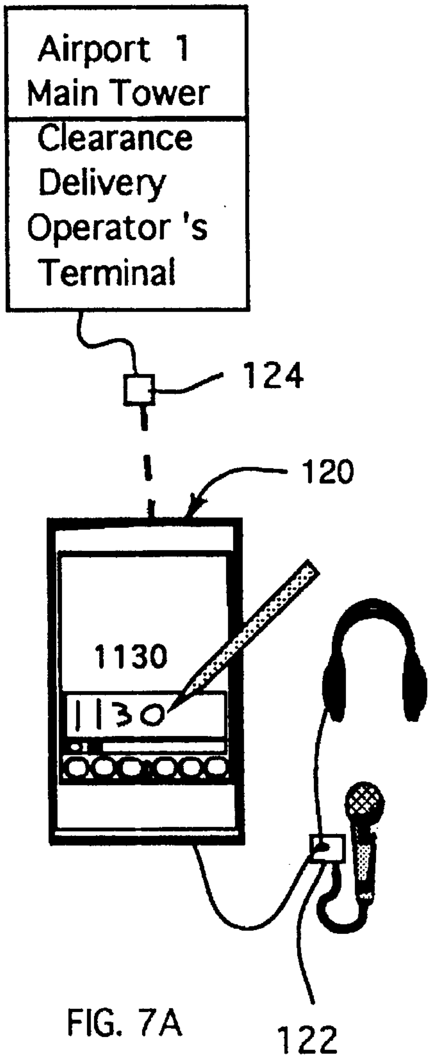
FIG. 7A is a schematic view of one way of imparting fresh data into a terminal at an airport tower, using a pen-based computer that is held by an air traffic controller in the tower.
Figure 7B:
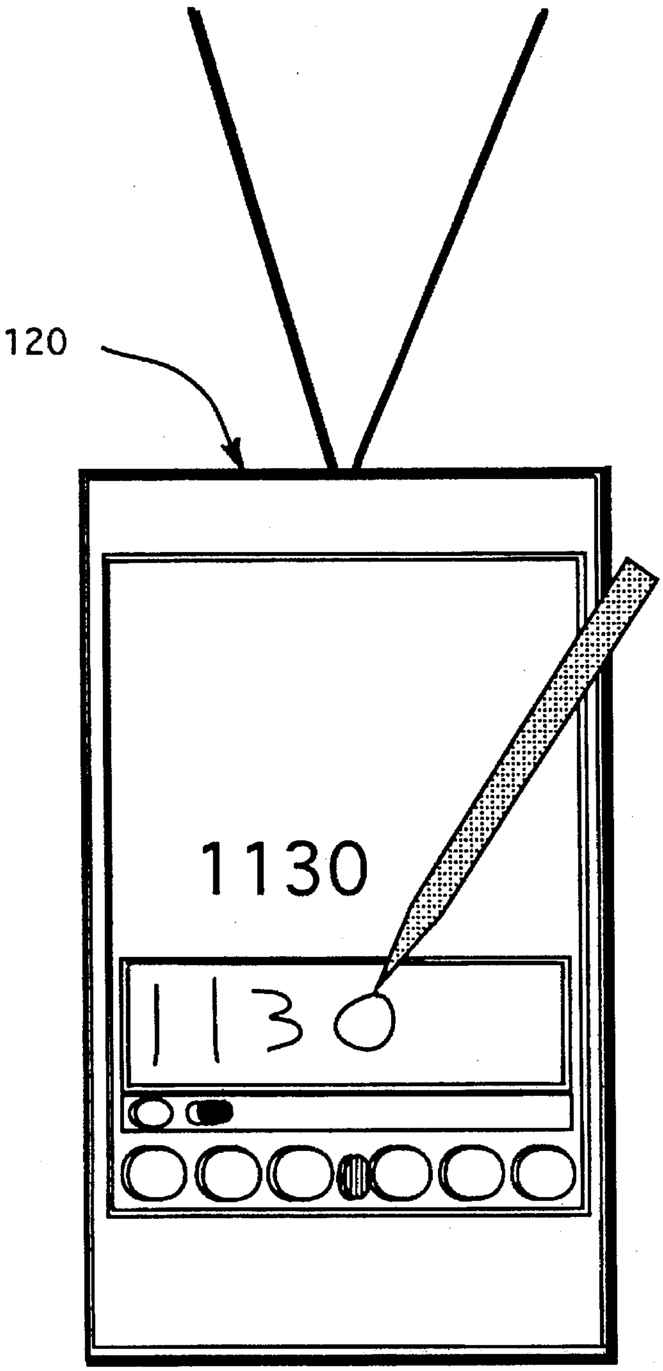
FIG. 7B is an enlarged showing of a pen-based computer of the type indicated in FIG. 7A.

Referring next to FIG. 7A, the manner in which a controller inputs data to a flight progress strip using a voice-based system is illustrated. A hand-held, pen-based transmitter/receiver 120 is shown at a controller's workstation. A switch 122 is conveniently nearby, to turn the system ON for effecting transmissions to a receiver 124 that is operatively connected to the terminal in front of the Clearance Delivery Operator. Another view of a pen-based computer 120 is shown in FIG. 7B, wherein a notation of "1130" has been written by a controller and digitized by the computer before transmitting the information to the terminal shown in FIG. 7A. By using such equipment, there is less likelihood of any person ever misreading handwritten information that properly belongs on a flight passage strip 24.

Figure 8:
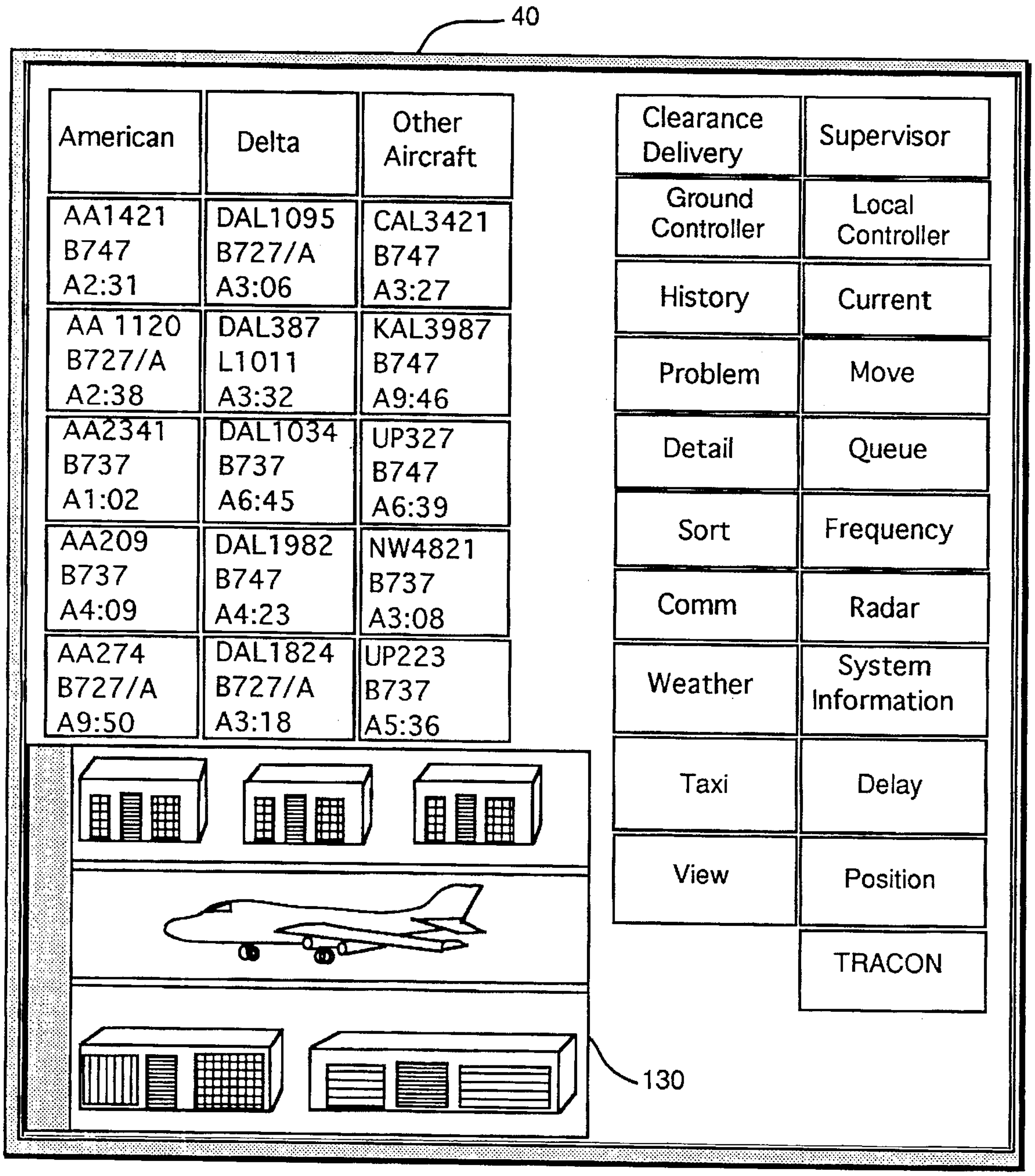
FIG. 8 is another showing of a display on computer screen, which display can be electronically placed in front of a controller in a tower, and showing how a remote part of an airport can be displayed (by use of a TV camera) for the controller by selecting the "View" icon on the screen.

Referring next to FIG. 8, another beneficial feature of the system disclosed herein is shown, wherein a video camera at a remote part of an airport may have an image presented on a screen 40—in response to a controller's selection of "View" in the right array of command icons. This image is indicated by the numeral 130. So if a building is located between a controller's line of sight from the tower to a particular spot on a taxiway, then pressing "View" can eliminate what would otherwise be a blind spot behind the building. In this regard, it should perhaps be noted that a controller's obstructed view of a portion of a runway at the Los Angeles airport was deemed to be a contributing factor in the Feb. 1, 1991 crash involving two airplanes, one already on the ground and the other landing.

Figure 9A:
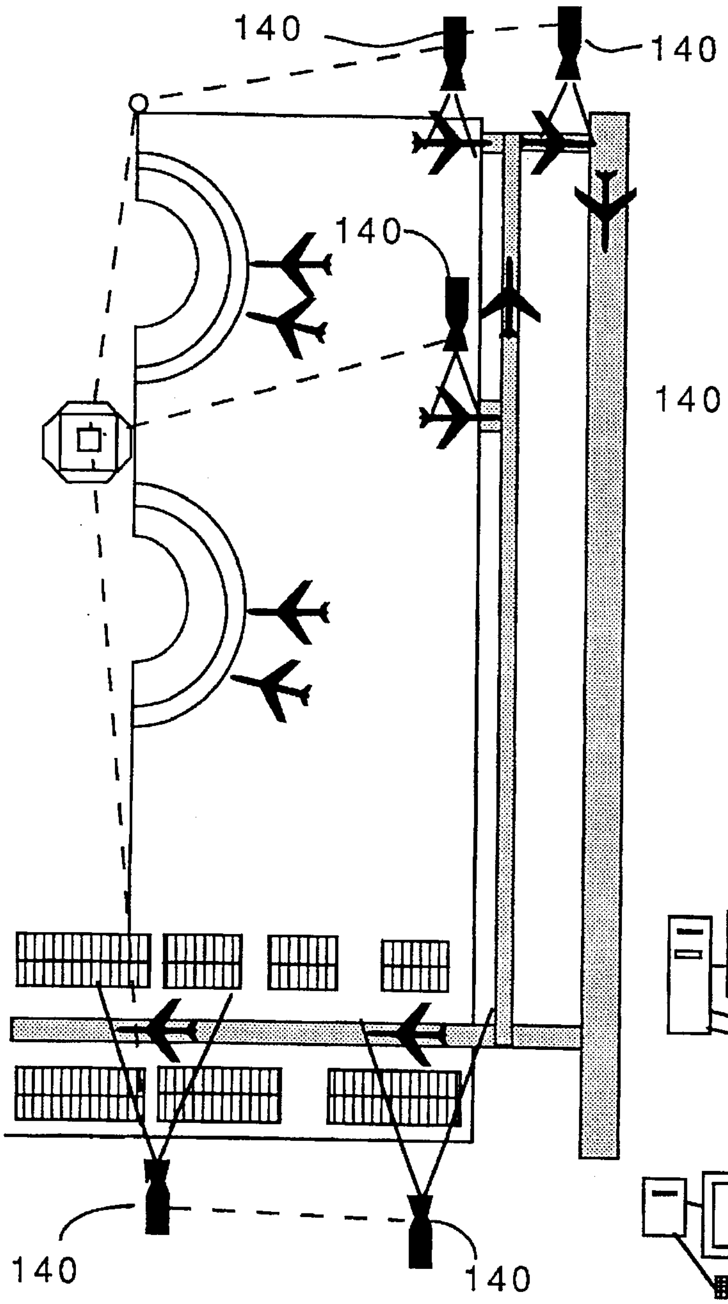
FIG. 9A is a diagrammatic plan view of a portion of an airport, showing how television cameras placed at strategic places around an airport can be used to provide a camera view of certain critical parts of a runway system, including taxiways, entrances to taxiways, and troublesome spots (like at Los Angeles, Calif.) where buildings hide certain portions of taxiways from a direct line of sight by a controller.
Figure 9B:
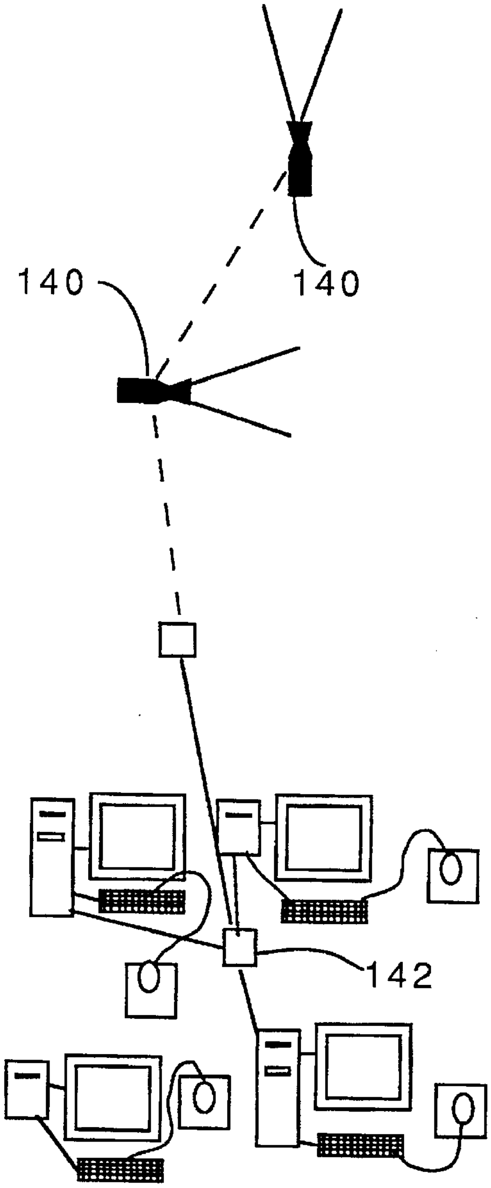
FIG. 9B is a schematic drawing of how television cameras can feed into a frequency demultiplexer, and any of several audio/visual MACINTOSH™ computers can be used by a controller to select a given image for display.
Figure 10:
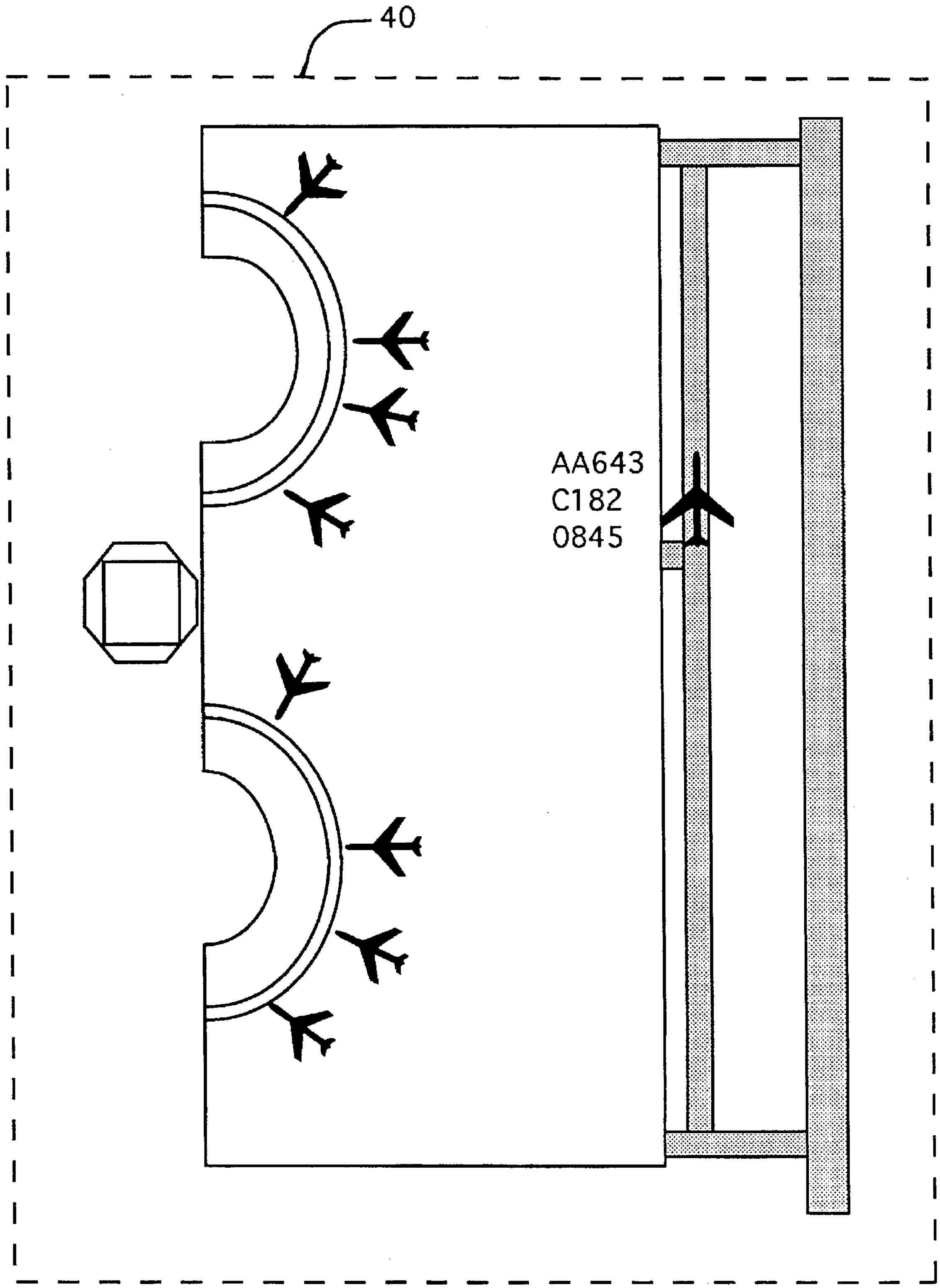
FIG. 10 is a showing of a screen display that would appear in front of a controller who has clicked on the icon for American Airlines Flight No. 643 in the left array, and dragged it to the icon in the right array labeled "Position"

FIG. 9A is a diagrammatic plan view of a portion of an airport, showing how television cameras 140 placed at strategic places around an airport can be used to provide a camera view of certain critical parts of a runway system. Those systems may include taxiways, entrances to taxiways, and troublesome spots where buildings hide certain portions of taxiways from a direct line of sight by a controller. FIG. 9B is a schematic drawing of how a plurality of television cameras 140 can feed into a frequency demultiplexer 142, and any of several audio/visual MACINTOSH™ computers can be used by a controller to select a given image for display;

FIG. 10 is a showing of a screen display that would appear in front of a controller who has clicked on the icon for American Airlines Right No. 643 in the left array, and dragged it to the icon in the right array labeled "Position." The plane's icon is shown as being on a taxiway headed toward the top of the figure. The size of each plane that is illustrated on such a "map" can also be varied with the actual size of the airplane, with large aircraft like a BOEING 747™ being shown significantly larger than, say, a smaller BOEING 737™.

Figure 11:
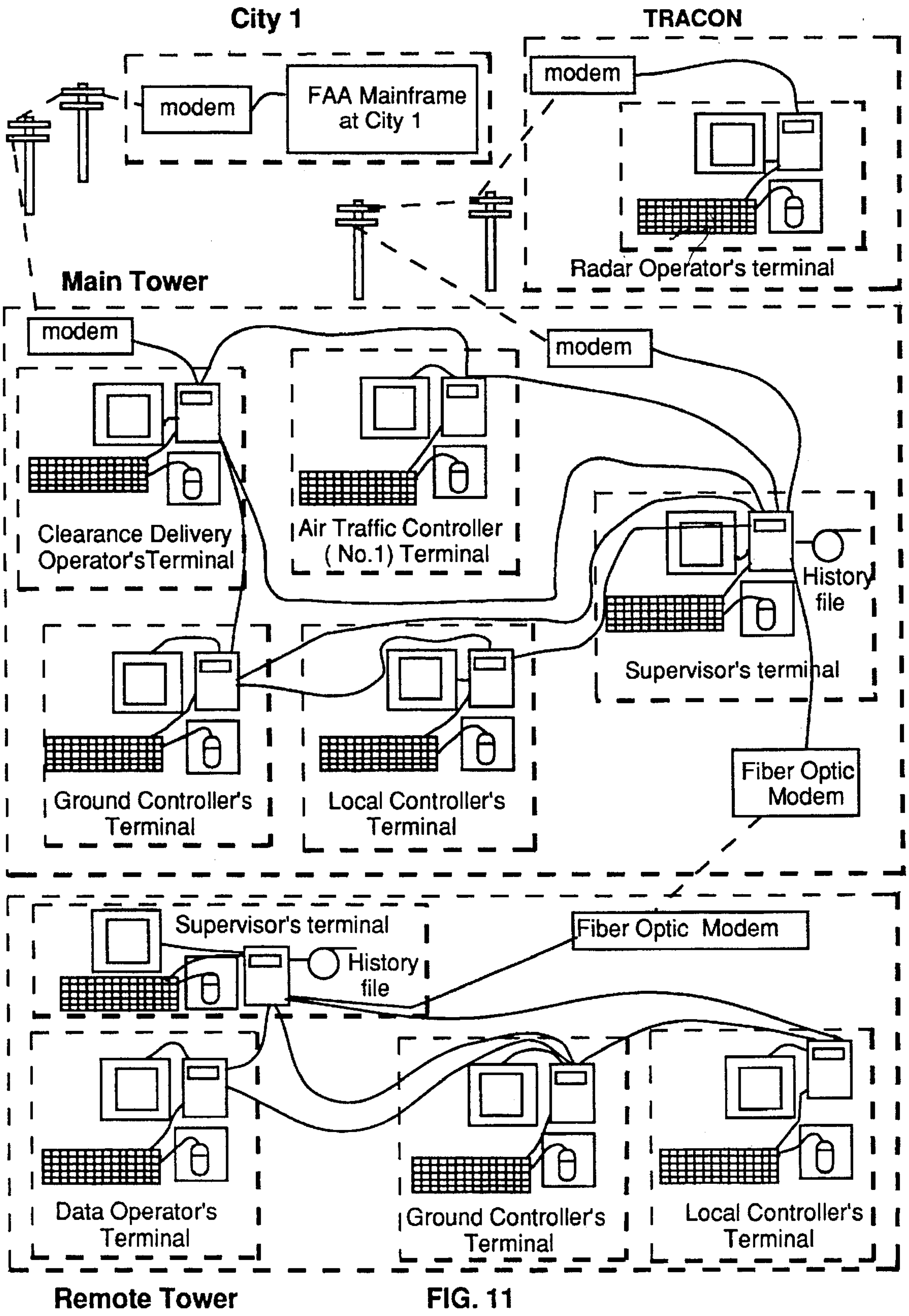
FIG. 11 is a schematic showing of how a plurality of air traffic controllers can communicate with one another using computer terminals—such that they will be able to transfer responsibility for a given aircraft, learn things that foster safety and convenience, organize their work, etc.

FIG. 11 is a schematic showing of how a plurality of air traffic controllers can communicate with one another and perform numerous tasks using computer terminals—such that they will be able to transfer responsibility for a given aircraft, learn things that foster safety and convenience, organize their work, etc. At an exemplary City 1, the main tower at an airport is shown with five workstations, namely, one each for a supervisor, a clearance delivery operator, a local controller, and a ground controller—plus a typical air traffic controller who would be sitting in front of a screen for handling a plurality of aircraft at any one time. So the showing of only five computer terminals in FIG. 11 is intended to be exemplary and not limiting. Of course, if the tower is relatively large, there may be several workstations at which air traffic controllers are doing their routine jobs of controlling aircraft, both on the ground and in the air. If they were shown and identified, these other controllers would likely be shown as Air Traffic Controller No. 2, Air Traffic Controller No. 3, etc. Also, to indicate that more than one tower (or other facility) can be used to control aircraft in the vicinity of an airport, a Remote Tower is indicated in the lower part of FIG. 11, and it can be electronically tied to the main tower by fiber optic modems. A distinct advantage of the system disclosed herein arises from recognition that many people find it difficult to throw out an old routine and accept a new one without establishing a comfortable familiarity with the new. As applied to operations in a control tower, it would be entirely possible to operate this new electronic system alongside the old fashioned manual system—for days, weeks, or even months, until both air traffic controllers and pilots feel comfortable enough with it to totally rely on the new system for controlling aircraft, on the ground and well as when they take off and land. By its nature, it would be entirely possible to implement this new system without discarding the old, until the efficacy of the new has been proved. That is, one controller could be performing task with the old fashioned system while a different controller is duplicating those tasks with the new system—and keeping track of the amount of time saved with the new system. Of course, many features of this new system cannot even be accomplished with the old, manual way of handling flight progress strips. As examples, it would be possible to continue to manually hand a flight progress strip from one controller to another who is five feet away; but it would not be possible to effectively do the same thing when the controllers are separated by a mile. Too, this new system makes it possible to highlight the image of an aircraft that is getting "stale" at is gate, by electronically putting a colored border around any icon that represents an aircraft that is, say, 30 or 45 minutes past its scheduled departure time. Such highlighting or flagging of aircraft for special attention, of course, cannot be accomplished with the old, manual system.

While only the preferred embodiment of the invention has been disclosed herein in great detail, it should be apparent to those skilled in the art that variations and modification could be made without departing from the spirit of the invention. Hence, the scope of the invention should be deemed to be measured only by the breadth of the appended claims.

What is claimed is:

1. A system for monitoring the takeoff and landing of an aircraft from an airport that is large enough to require the services that are routinely associated with operations at a control tower, comprising the combination of:

a) at least one airport from which various ones of a plurality of aircraft can be expected to depart and land, and said at least one airport having a control tower in which air traffic controllers routinely perform their duties of monitoring and controlling the takeoff and landing of individual aircraft;

b) a centralized computer for effecting air traffic control of aircraft as they move from one airport to another, and said centralized computer containing pre-programmed data about a variety of aircraft as well as a plurality of airports from which various ones of the aircraft can be expected to depart and land, and the centralized computer also having current data about a particular aircraft's location, its scheduled departure time from its present airport location, and its anticipated arrival time at another airport, with at least some of the current data being supplied to the centralized computer in the form of a flight plan submitted by the pilot of the aircraft, and the centralized computer also having a data packet associated with each aircraft that is expected to take off from and land at an airport;

c) a plurality of electronically interconnected computer terminals in the control tower of an airport, each of which terminals has a computer screen that can be observed and accessed by an air traffic controller, and said computer screens having images in a first array associated with individual ones of aircraft that are being monitored, and said computer screens also having a set of distinct images in a second array, and at least some of the images in the second array being associated with the performance of tasks that are routinely associated with the duties of air traffic controllers; and d) means for permitting an air traffic controller to select a given aircraft in the first array of images and perform an air traffic control task that is related to the selected aircraft, and the performance of said air traffic control task being accomplished by the subsequent selection of an image in the second array of images.

2. The system as claimed in claim 1 wherein the images in the second array include—at a minimum—an image associated with a second air traffic controller, such that an air traffic controller in front of a first computer screen can select an image in the first array and subsequently select an image in the second array that is associated with a second air traffic controller, and the sequential selection of the two images has the effect of transferring the data packet associated with the selected image in the first array to the air traffic controller who was selected in the second array, such that responsibility for handling a particular aircraft can be transferred from one controller to another by the sequential selection of one image in the first array and one image in the second array.

3. The system as claimed in claim 1 and further including a special computer terminal in the control tower at each one of a plurality of airports, and the special computer terminal being at a workstation that is designated as a clearance delivery operator's terminal, and the special computer terminal being in operative communication with the centralized computer to receive inputs in the form of data packets associated with outgoing aircraft for a respective airport.

4. The system as claimed in claim 1 and further including a special computer terminal in the control tower at each one of the plurality of airports, and said special computer terminal being at a workstation that is designated as a local controller's terminal, and the special computer terminal being in operative communication with the centralized computer to receive inputs in the form of data packets associated with incoming aircraft for a respective airport.

5. The system as claimed in claim 1 and further including at least two special computer terminals in the control tower at each one of the plurality of airports, and one of said special computer terminals being at a workstation that is designated as a ground controller's terminal, and the other of said special computer terminals being at a workstation that is designated as a clearance delivery operator's terminal, and the ground controller's terminal being in operative communication with the clearance delivery operator's terminal to receive inputs in the form of data packets associated with outgoing aircraft for a respective airport.

6. The system as claimed in claim 5 wherein the computer screen associated with the ground controller's terminal is a touch-sensitive computer screen, and the ground controller's terminal is programmed so that an air traffic controller can transfer responsibility for handling a particular aircraft to a person working at a different terminal by sequentially touching an image in the first array of images and then touching an image in the second array of images.

7. The system as claimed in claim 1 wherein the computer terminals and their associated computer screens operate on the principle of transferring data by clicking on a displayed image with a mouse and dragging that image to another location on the computer screen, and wherein a given image in the first array is susceptible to being selected by clicking on it with a mouse, and wherein a selected image in the second array is susceptible of being selected by virtue of dragging the selected image from the first array until it overlaps the selected image in the second array and then releasing the mouse.

8. The system as claimed in claim 1 wherein the images that are present in the computer screen's first array include identifying data about a particular airplane that includes the airplane type, its flight identification number, and is scheduled time of departure.

9. The system as claimed in claim 1 wherein the images that are present in the computer screen's second array include:

a) identifiers for any controllers who might potentially assume responsibility for a given airplane, b) a command key that causes the location of a given airplane on the airport to be displayed on the computer screen, and c) a command key that prompts a full display of the information in a data packet to be presented on a computer screen.

10. The system as claimed in claim 1 and including a command key in the second array that causes the location of a given airplane to be displayed as a stylized showing of an airplane on a simplified map of the airport, and the stylized showing is scaled so that a relatively small airplane appears small and a relatively large airplane appears large.

11. The system as claimed in claim 1 wherein the airport has multiple control towers, and the ground control terminal is in a first control tower and a local air traffic control terminal is in a different control tower.

12. The system as claimed in claim 1 wherein the images in the first array are sized so as to permit placement of about 36 images on a computer screen that measures 20 inches diagonally.

13. The system as claimed in claim 1 wherein the images in the second array are sized so as to permit placement of at least 36 images on a computer screen that measures 20 inches diagonally.

14. The system as claimed in claim 1 and further including a hand-held pen-based computer with an optical communication feature that enables a person to transmit files by an optical link to a transmitter/receiver associated with a respective one of the computer terminals, and the pen-based computer having an handwriting-recognition program for converting handwritten entries into electronically recognizable ASCII characters, such that data that is handwritten by an air traffic controller on the screen of the pen-based computer may be added to the data packet for a particular aircraft, and whereby data that is approximately real-time data can be added to historical data at the airport where an aircraft is located and at the approximate time that the aircraft is landing or taking off.

15. The system as claimed in claim 1 wherein the images in the first array contain alphanumeric indicia that are unique to each of the aircraft that are associated with the respective images.

16. The system as claimed in claim 1 wherein the computer screens are color screens, and further including means for changing the display color of an image in the first array when that image has been individually selected for subsequent action.

17. In an airport tower where it is expected that the responsibility for controlling a particular aircraft will at some time be routinely transferred from a first controller to a second controller, and wherein each of the controllers has a computer screen on which images are displayed and moved, the method of transferring responsibility for the control of a particular aircraft, comprising the steps of:

a) on the computer screen of a first controller, displaying a plurality of images that ale segregated into first and second arrays, with the first array of images containing images that are uniquely associated with a data packet for each of a plurality of aircraft, and each of said data packets containing technical information about a particular aircraft and its flight plan, and the second array of images being indicative of a controller's potential responsibility for selected ones of the aircraft that are represented in the first array of images;

b. choosing a given aircraft for which the responsibility for control is to be transferred to a second controller by choosing the image of that particular aircraft in the first array of images;

c. subsequently selecting in the second array that particular image that is associated with a second controller who is to assume responsibility for the aircraft from the first controller; and d. with a computer, electronically transferring the data packet and the image associated therewith from the computer screen of the first controller to the computer screen of the second controller as a result of selecting an image in the second array.

18. The method as claimed in claim 17 wherein the computer screens in front of the first and second controllers are touch-sensitive computer screens, and the selection of a given aircraft is accomplished by manually touching the image associated with that aircraft in the first array, and the selection of an image in the second array is also made by manually touching the computer screen over the appropriate image.

19. The method as claimed in claim 17 wherein the selection of images on a computer screen is accomplished orally by the actions of a controller speaking into a microphone that is electronically coupled to a computer having voice-recognition capabilities.

20. The method as claimed in claim 17 and further including the step of recording, on tape, for archival purposes, each transfer of a data package from one controller to another.

* * * * *